(12) United States Patent
Jain et al.

(10) Patent No.: US 8,938,118 B1
(45) Date of Patent: Jan. 20, 2015

(54) METHOD OF NEIGHBOR EMBEDDING FOR OCR ENHANCEMENT

(71) Applicants: Rajiv Jain, Alexandria, VA (US); David C. Smith, Columbia, MD (US)

(72) Inventors: Rajiv Jain, Alexandria, VA (US); David C. Smith, Columbia, MD (US)

( * ) Notice: Subject to any disclaimer, the term of this patent is extended or adjusted under 35 U.S.C. 154(b) by 144 days.

(21) Appl. No.: 13/694,853

(22) Filed: Dec. 12, 2012

(51) Int. Cl.
G06K 9/62 (2006.01)

(52) U.S. Cl.
CPC .................................. G06K 9/6217 (2013.01)
USPC ......................................................... 382/159

(58) Field of Classification Search
None
See application file for complete search history.

(56) References Cited

U.S. PATENT DOCUMENTS

| | | | |
|---|---|---|---|
| 7,218,796 B2 | 5/2007 | Bishop et al. | |
| 7,379,611 B2 | 5/2008 | Sun et al. | |
| 8,233,734 B2 | 7/2012 | Zhang et al. | |
| 2003/0012407 A1* | 1/2003 | Rosenbaum et al. | 382/101 |
| 2004/0218834 A1* | 11/2004 | Bishop et al. | 382/299 |
| 2008/0267525 A1 | 10/2008 | Dai et al. | |
| 2011/0305404 A1 | 12/2011 | Lin et al. | |
| 2013/0077873 A1* | 3/2013 | Bar Hillel et al. | 382/218 |

OTHER PUBLICATIONS

H. Chang et al., "Super Resolution through Neighbor Embedding", CVPR, vol. 1, pp. 275-282, 2004.
S.T. Roweis et al., "Nonlinear Dimensionality Reduction by Locally Linear Embedding" Science, vol. 290, pp. 2323-2326, 2000.
J. Wang et al., "Resolution Enhancement based on Learning the Sparse Assocaiton of Patches", Pattern Reconition Letters, vol. 31, pp. 1-10, 2010.
B. Li et al., "Locality Preserving Constraints for Super-resolution with Neighbor Embedding", IEEE ICIP 2009, pp. 1189-1192.

* cited by examiner

*Primary Examiner* — Stephen R Koziol
*Assistant Examiner* — Amandeep Saini (57) ABSTRACT

Single-image super-resolution (SISR) is the problem of generating a high resolution image from a single low resolution image. The SISR technique known as neighbor embedding utilizes a training ensemble of pairs of low and high resolution image patches, where the patches in a given pair represent the same image region. The present invention improves upon prior neighbor embedding algorithms by offering a practical, computationally efficient method of neighbor embedding for generating a high resolution version of a low resolution image. The technique may also be applied to generate high resolution versions of low resolution text images for subsequent input into OCR engines. OCR character error rates found on the high resolution images are drastically lower than those found when OCR is applied to the original low resolution text images.

7 Claims, 8 Drawing Sheets

Prior Art

80 — In physics, special relativity is a fundamental theory concerning space and time, developed by Albert Einstein in 1905 as a modification of Galilean relativity. The theory was able to explain some pressing theoretical and experimental issues in the physics of the time involving light and electrodynamics, such as the failure of the 1887 Michelson-Morley experiment.

Tesseract transcript of original LR image (86.6% CER)

81 — W., ww.=.^.~.^.~.^.n,w mwqmmm W. .m W Mm W ...n fm," \ms.f\~.;,<~=\\. \, M...^.<^~fy. M W ... W ..$.\^m ^~m^.q~<^,$. m..,.~.m^ .M ".,^.,^.~;% m"_.M MM~.$$"^.,~.= ,^.^.^, 'M $ M, .mf W^\.,~ Mm .mm Tesseract transcript of B1 HR image estimate (24.8% CER)

82 — II physia, Special relamly B a fundamental lheofy concerning space and tme, developed by Amen Elnsten II 1905 as a modihmlion of Galilean selauvly. The meouy was alie IO explain some pressmg lheocecical and experineuw issues in the physics 01 me urne mohnmg lighl and elecuodynsnizs. such as the future ol mc 1887 Michclsowmoriey expenmem Tesseract transcript of NE HR image estimate (1.1% CER)

83 — In physics, special relativity is a fundamental theory concerning space and time, developed by Alben Einstein in 1905 as a modification of Galilean relativity. The theory was able to explain some pressing theoretical and experimental issues in the physics of the time involving light and electrodynamics, such as the failure of the 1887 Michelson-Morley experiment.

Figure 8

METHOD OF NEIGHBOR EMBEDDING FOR OCR ENHANCEMENT

FIELD OF INVENTION

The present invention relates to image analysis, and in particular to raising the image resolution for OCR enhancement.

BACKGROUND OF THE INVENTION

Generating a high resolution (HR) image from one or more low resolution (LR) images is called image super resolution (SR). HR images have a higher pixel density than their LR counterparts, and provide details which are obscured in LR versions. Image SR is very useful in a number of applications including satellite imagery, pattern recognition, and medical diagnosis, to name a few.

Single-image super-resolution (SISR) is the problem of generating a HR image from just one LR image. There are two basic types of image SISR techniques. The first involves interpolation, which cannot recover missing high-frequency information. The second type utilizes learning based methods (training). While the prior art has applied variants of learning based methods to scene, animal, and human images, few have successfully applied these methods to text images. Additionally, electronic conversion of scanned text images into machine-encoded text (e.g. ASCII) is known as optical character recognition (OCR). OCR is essential for automatic processing of text documents by facilitating electronic searching and efficient storage. OCR is used in machine translation, text-to-speech applications, text data mining, and is widely used for data entry from printed records. When the text resolution is poor, OCR engines frequently have unacceptably high character error rates (CER). Such catastrophic performance often occurs when documents are scanned at low dpi (pixels per inch) to conserve memory and even when the LR documents are readable by humans. Furthermore, the interpolation methods result in very high character error rates when OCR is applied to their HR text image estimates. Additionally, learning based methods exhibit computational speeds which are too slow in practice for OCR enhancement, unless their training models are quite small. This limitation on model size means that prior art models must be specifically trained on a particular low resolution font style and size, and cannot be applied to a different font style and size The present invention addresses the SISR problem for various types of grayscale images (i.e. scenes, faces, text) and for text documents. The present invention also discloses a method that improves OCR performance by lowering OCR character error rate (CER), which we refer to as OCR enhancement. The present invention offers a solution that significantly accelerates computational speed compared to prior art learning based SISR so that a single model suffices for most Latin font styles and sizes, and also significantly lowers CER when HR image estimates obtained with the invention are input to OCR engines.

The prior art includes several published articles including "Super Resolution through Neighbor Embedding" by H. Chang, D. Yeung, and Y. Xiong, CVPR, volume 1, pp. 275-282, 2004. Chang et al discloses a method for creating high resolution images. However Chang et al's algorithm is inadequate for OCR enhancement because it utilizes an exact nearest neighbor search which is not fast enough for OCR. Specifically, exact nearest neighbor searches require exhaustively searching thousands of training vectors at multiple locations in the low resolution input image, which results in an extended processing time. Since this exhaustive search is extremely slow, Chang et al's method is limited to using an individual training model for each font style and size. Consequently, Chang et al's method also requires knowledge of the font style and size of the LR input image in order to apply the matching training model. However, with OCR enhancement, the font style and size of the input image are generally unknown. Therefore, Chang's method is inadequate for OCR enhancement. Additionally, Chang's method uses a feature vector consisting of first and second order partial derivatives of the LR input image at each pixel value in a corresponding K×K image patch, resulting in a feature vector which is four times longer than the feature vector of the present invention. Consequently Chang's et al's method uses unnecessarily large training models which require significant amounts of computer memory. This large memory footprint limits the amount of training information that can be represented by Chang et al's models, which in turn restricts the accuracy of Chang's HR image estimates.

The present invention uses a feature vector that is only 25% as long as Chang's and results in a model that requires only a quarter of the memory required for the Chang models. As such, the present invention results in four times as much training information that can be represented in the same computer memory as Chang's method, which in turn results in more accurate HR image estimates.

Other notable articles include "Nonlinear Dimensionality Reduction by Locally Linear Embedding" by S. T. Roweis and L. K. Saul (Science, vol. 290, pp. 2323-2326, 2000), "Resolution Enhancement based on Learning the Sparse Association of Patches" by J. Wang, S. Zhu, Y. Gong (Pattern Recognition Letters, vol. 31, pp. 1-10, 2010), "Locality Preserving Constraints for Super-resolution with Neighbor Embedding" by B. Li, H. Chang, S. Shan, and X. Chen (IEEE ICIP 2009, pp. 1189-1192). While the aforementioned prior art considers the noted SISR problem, none offer a solution that is as computationally efficient and accurate as the present invention and results in a lower CER than the prior art given the same memory resources. Not only does the prior art require significantly more memory than the present invention but it also takes more than 1000 times longer to construct a HR image estimate. The above mentioned articles are hereby incorporated by reference into the specification of the present invention.

The prior art also includes the following patents. U.S. Pat. No. 7,379,611 entitled "Generic Image Hallucination" discloses a learning based method SISR method. Here the prior art differs from the present invention because it uses a training set comprised of LR/HR pairs of "primitives", i.e., patches which focuses on edges, ridges or corners. U.S. Pat. No. 7,379,611 is hereby incorporated by reference into the specification of the present invention.

U.S. Pat. No. 8,233,734 entitled "Image Upsampling with Training Images" discloses a method that creates a high resolution version of a low resolution input image creating a "course" HR image from a LR input image using patch matching where each patch contains a primitive (i.e., an edge, corner, or ridge) and use probabilistic models of primitives and contour smoothness constraints. The present invention does not use primitives or probabilistic models of same. U.S. Pat. No. 8,233,734 is hereby incorporated by reference into the specification of the present invention.

U.S. Pat. No. 7,218,796 entitled, "Patch-based Video Super-resolution", discloses a method for video super-resolution that uses a training set containing HR/LR patch pairs and employs patch matching. Here, the prior art represents low resolution patches, primarily by using only the patch values, or by dividing the patch values by the energy in the patch. The present invention does not employ this type of feature vector. U.S. Pat. No. 7,218,796 is hereby incorporated by reference into the specification of the present invention.

U.S. Patent Appl. #20080267525, entitled "Soft Edge Smoothness Prior and Application on Channel Super Resolution", discloses SISR that is based on edge segment extraction from the input LR image and performing a super-resolution on the extracted edges. The present invention does not require the use of edge information. U.S. Patent Appl. #20080267525 is hereby incorporated by reference into the specification of the present invention.

U.S. Patent Appl. #20110305404, entitled "Method and System for Example-based Face Hallucination discloses a learning based method which uses a training set of LR/HR face images, and in addition uses a dimensionality reduction technique to project the LR training images (each considered as a vector of pixel values) into a low dimensional space. Then an input LR image is projected in the same manner, and the projected LR input image is matched to the nearest LR projected training images. Thus, the method does not use local patches as in neighbor embedding, but uses global image projections in matching. U.S. Patent Appl. #20110305404 is hereby incorporated by reference into the specification of the present invention.

SUMMARY OF THE INVENTION

An object of the present invention is to offer a computationally efficient method of neighbor embedding (NE) to generate a high resolution output image from a low resolution input image.

Another object of the present invention is to generate a high resolution output image from a low resolution input text image which can be inputted into an OCR engine, which results in significantly lower character error rates than those found when the engine is applied directly to the low resolution text image.

The present method comprises the following steps. First, a training set, $\{(FL_{n,m}, H^*_{n,m})\}$ is created. Next, a set of randomized k-d trees is created from the training set. At least one low resolution input image, P is received. From this low resolution image, P, a high resolution output image, T, is generated using the training set and the set of randomized k-d trees. Finally, when said input image is a text image, a text file is generated by inputting the high resolution output image, T, into an OCR engine.

DETAILED DESCRIPTION

Figure 1:
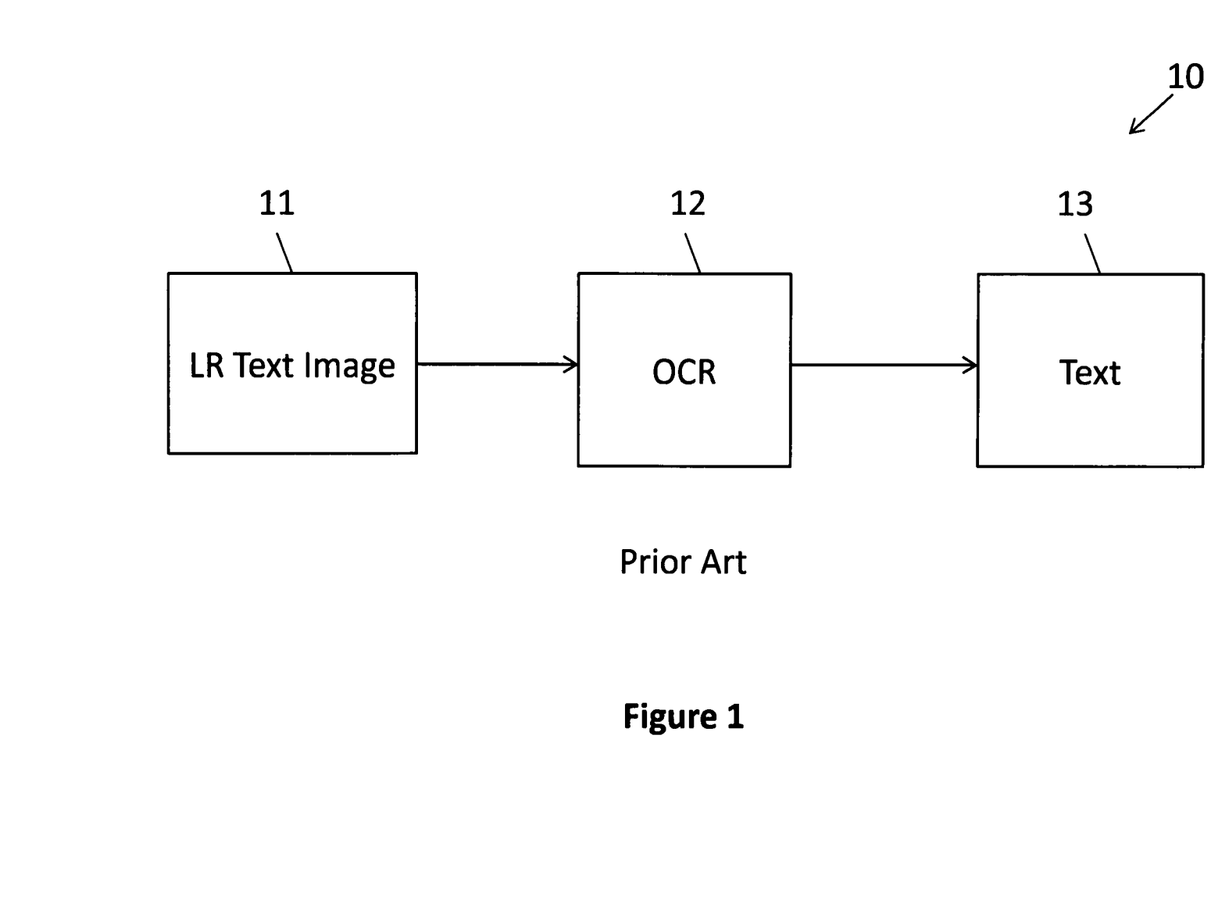
FIG. 1 is a flowchart depicting the prior art.
Figure 2:
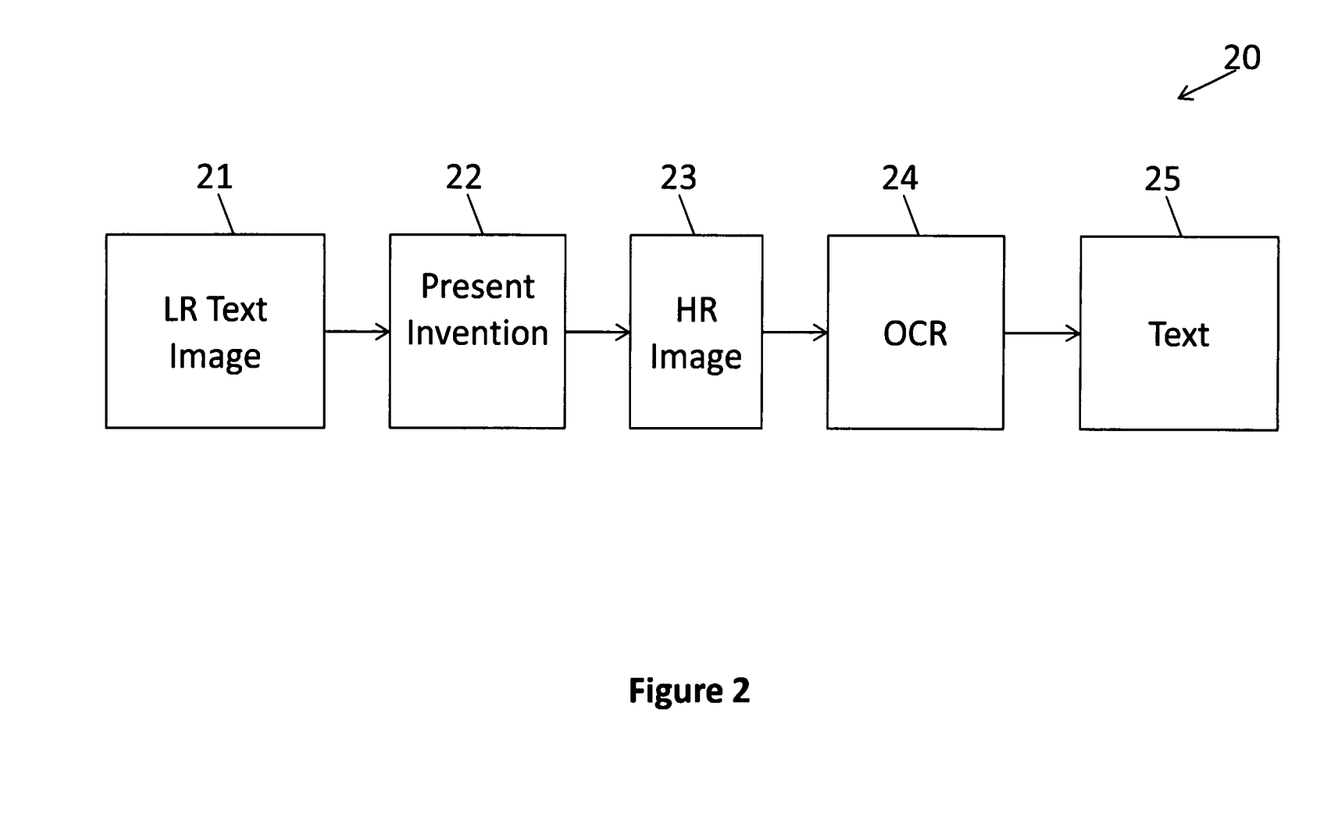
FIG. 2 is a flowchart depicting the present invention.

FIGS. 1-2 illustrate the difference between known methods employed in OCR 10 and the OCR process in the present invention 20. With respect to the known methods, a low resolution text image is inputted 11 to an OCR engine 12 directly to generate a text file 13. However, as discussed above, the result is frequently of poor quality and in many cases, incomprehensible. In contrast, FIG. 2 depicts the present invention in that a low resolution text image 21 can be manipulated using learning based techniques 22 as discussed below to produce a high resolution image 23. This HR image can then be fed into an OCR engine 24 to generate a text file 25 that has a significantly lower character error rate than that produced by the prior art's OCR process. In both instances, it is obvious to individuals skilled in the art that these methods are being implemented on computer systems that are composed of varying computing devices and can be adapted to work with various types of systems.

As mentioned previously, the present invention offers solutions to two different problems. The first problem is how to generate an HR image from a LR input image (i.e. scene, animal, face, text images) using single-image super-resolution (SISR) in a manner which is computationally faster and requires significantly less computer memory than prior learning based methods. The second problem is how to reduce the character error rate currently found with OCR engines on low resolution input.

Figure 3:
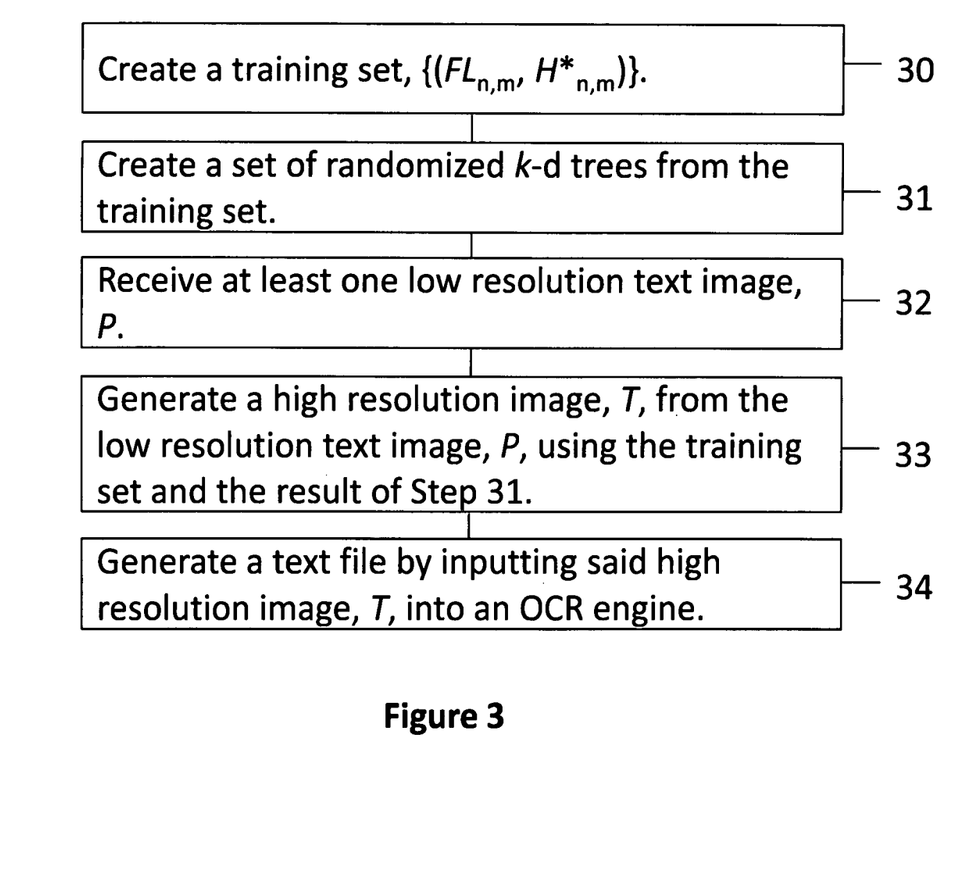
FIG. 3 is a flowchart depicting the present invention.

FIG. 3 depicts a computationally efficient method of neighbor embedding to produce a HR output image from an input LR text image or text document using SISR. First a training set of paired elements, $\{(FL_{n,m}, H^*_{n,m})\}$, is created 30 where $FL_{n,m}$ are feature vectors and $H^*_{n,m}$ are high resolution image patches. Next, a set of randomized k-d trees are created using the first elements, $FL_{n,m}$, as leaf nodes 31. The set of k-d trees that are generated allow for an approximate nearest neighbor search which is 1000× faster, with a negligible loss of accuracy, than the exact nearest neighbor search by the prior art. The set of randomized k-d trees can be generated in various ways but in the preferred embodiment, the set of randomized k-d trees are generated using OpenCv Fast Library for Approximate Nearest Neighbors (FLANN). Next, at least one low resolution text image, P, is received 32. A high resolution image, T, is then generated from the low resolution text image, P, using the training set and the set of the randomized k-d trees that were previously created 33. People skilled in the art recognize that T is generated from a training set which is constructed using the same process which produced P (i.e. downsampling, scanning). As shown in FIG. 2, when the input image P is a text image, this high resolution output image, T, can then be inputted into an OCR engine to generate text file 34.

Figure 4:
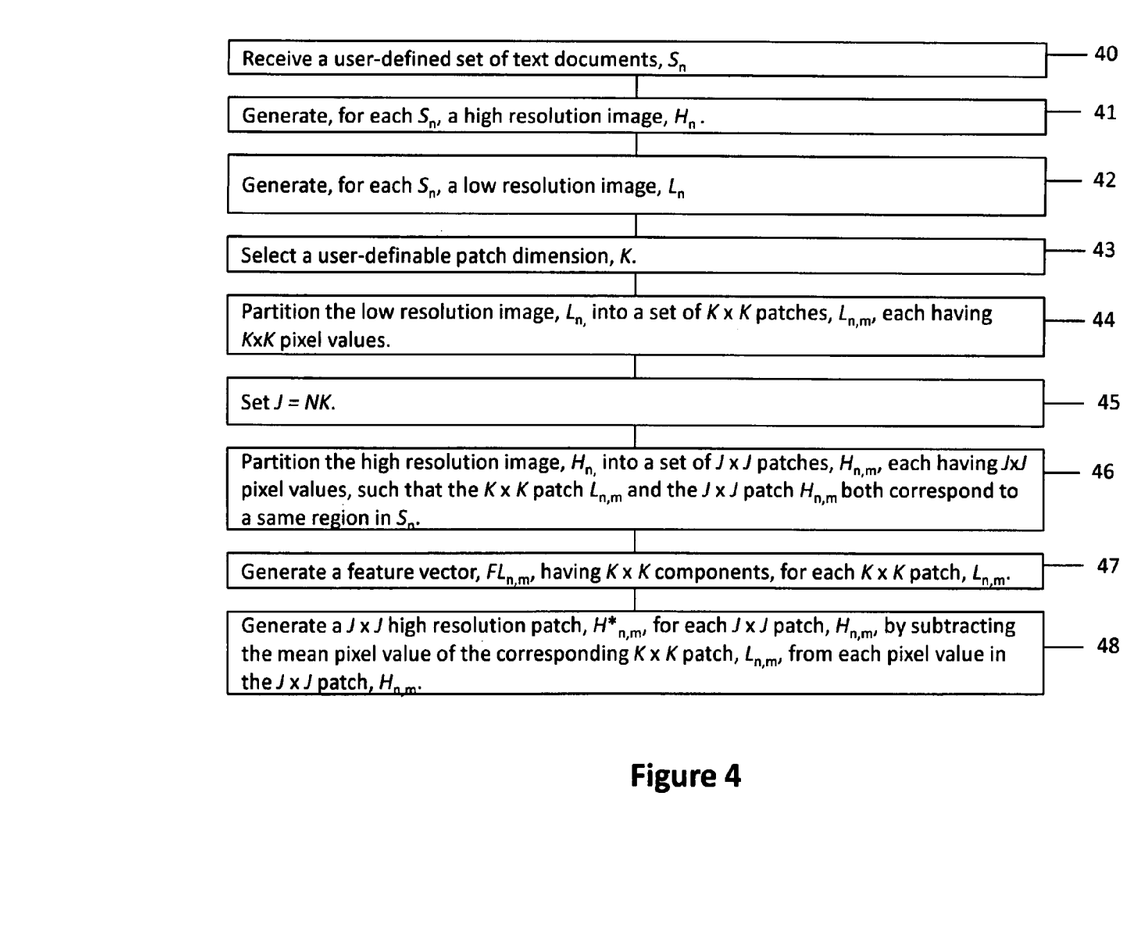
FIG. 4 is a flowchart depicting the present invention.

As mentioned above, the first step of the present invention's method is to create a training set 30. FIG. 4 depict the process of creating the training set. The process to create a training set can vary depending on whether the user is starting with a user-defined set of high resolution images or a user-definable set of text documents, $S_n$, that contain examples of a serif font (e.g. Times New Roman) and/or a sans serif font (e.g. Arial) having approximately the same number of words in 6 pt, 8 pt, 10 pt, and 12 pt. If the user is starting with a user-definable set of high resolution images, $H_n$, corresponding low resolution images $L_n$ can be generated by downsampling each $H_n$ by a positive integer, N. In the preferred embodiment, N is a user-definable small positive integer in the range of two to five 42. On the other hand, if the user is starting with a user-definable number of text documents 40, a high resolution image, $H_n$, is generated by scanning each $S_n$ at a high dpi 41 and a low resolution image, $L_n$, is then generated by scanning each $S_n$ at low dpi 42. Note that the high dpi is equal to, N times the low dpi. Next, a patch dimension, K, is selected 43 where K is a user-definable small positive integer. In the preferred embodiment, K is in the range of two to five.

Each low resolution image, $L_n$, is then partitioned into a set of possibly overlapping K×K pixel patches, $L_{n,m}$, where each K×K pixel patch has K×K pixel values 44. Note that the number of low resolution patches used in training depends on the dimensions of the low resolution images, $L_n$. For example, if $L_n$ is 8×8 and K=4, there will be 4 non-overlapping K×K patches extracted from $L_n$. However, overlapping patches results in more training patches. For instance, if $L_n$ is 8×8 and K=4 and there is an overlap of 2, then there will be 9 overlapping K×K patches extracted from $L_n$. Additionally, the value of each pixel value depends on the type of image it is (i.e. for a TIF image, the value may range from 0-255, etc).

The next step is to set J=NK using the user-defined values for N and K 45. The high resolution image, $H_n$, is then partitioned into a set of J×J pixel patches, $H_{n,m}$, such that pixel patch $L_{n,m}$ and pixel patch $H_{n,m}$ both correspond to the same specific image region 46. Note that the number of J×J high resolution patches, extracted from $H_n$ will be the same as the number of K×K low resolution patches, $L_{n,m}$, extracted from $L_n$ since they are in one-to-one correspondence. Next, a feature vector, $FL_{n,m}$ is generated for each low resolution patch, $L_{n,m}$ 47. Additionally, the J×J pixel patch has J×J number of pixel values associated with it. Finally, a J×J high resolution patch, $H^*_{n,m}$ is generated for each said high resolution patch, $H_{n,m}$, by subtracting the mean pixel value of said corresponding K×K pixel patch, $L_{n,m}$, from each pixel value in said J×J pixel patch, $H_{n,m}$ 48.

Figure 5:
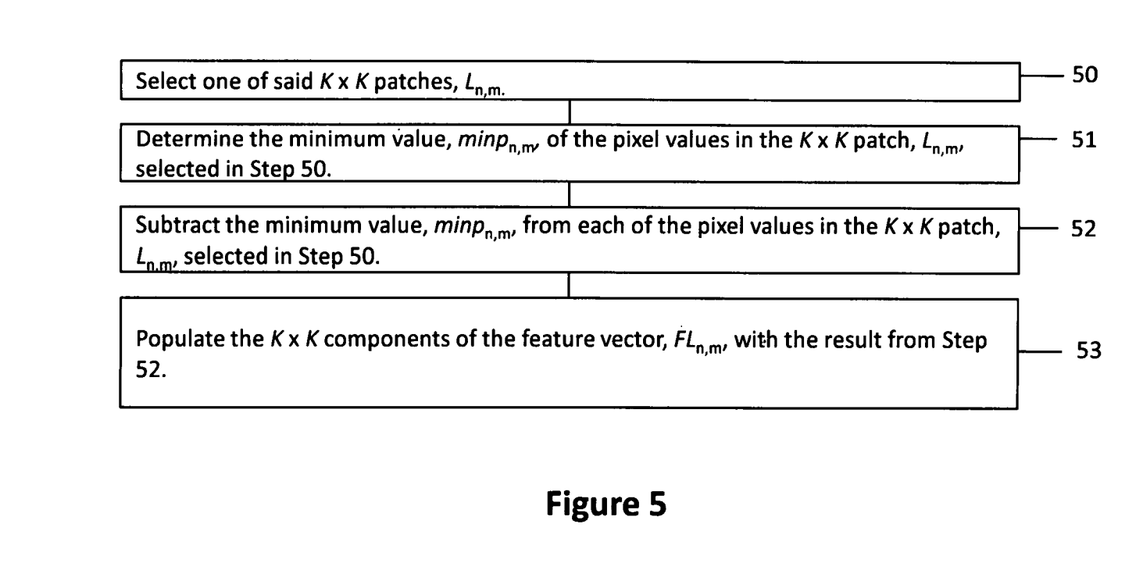
FIG. 5 is a flowchart depicting the present invention.

FIG. 5 depicts how a feature vector, $FL_{n,m}$, having K×K components, is generated for each low resolution patch, $L_{n,m}$. This is accomplished by first selecting one of the K×K pixel patches, $L_{n,m}$, generated above 50 and then determining the minimum value, $\text{minp}_{n,m}$, of the pixel values in the selected low resolution patch, $L_{n,m}$ 51. The $\text{minp}_{n,m}$ value is then subtracted from each of the pixel values in the selected low resolution patch $L_{n,m}$ 52. Next, the components of the feature vector, $FL_{n,m}$ are populated with the K×K values which result from subtracting $\text{minp}_{n,m}$ from each pixel value in $L_{n,m}$ 53.

Figure 6:
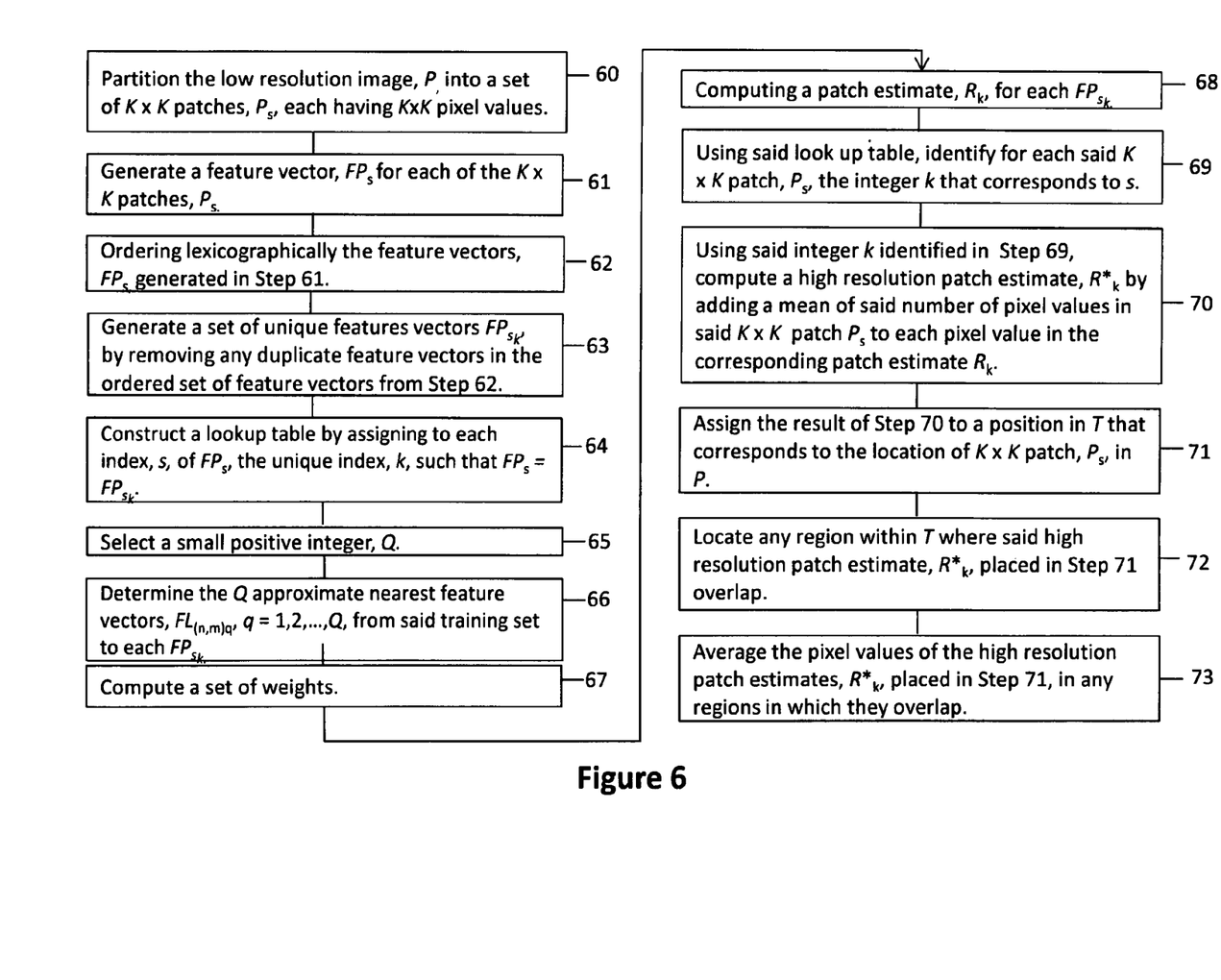
FIG. 6 is a flowchart depicting the present invention.

FIG. 6 depicts how a high resolution image, T, is generated from a low resolution image, P. This is accomplished by first partitioning the low resolution image, P, into a set of K×K patches, $P_s$ having K×K pixel values 60. Next, a feature vector $FP_s$ is generated for each of the K×K patches $P_s$ 61. Note that the size of P and the patch dimension K determine how many patches $P_s$ are automatically extracted from P and one feature vector is made from each extracted patch $P_s$. The feature vectors $FP_s$ are generated using the same process used to generate the feature vectors during the creation of the training set except that instead of using the training patches $L_{n,m}$, the patches $P_s$ from the user-selected image P are used.

The next step is to lexicographically order the feature vectors, $FP_s$ generated in the previous step 62. Next, a set of unique features vectors, $FP_{s_k}$, is generated by removing any duplicate feature vectors in the set of feature vectors $FP_s$ 63. Lexicographically ordering the feature vectors, $FP_s$, and removing any duplicate feature vectors provides an additional speed advantage by skipping over white space or other homogeneous regions in the low resolution text image. Next, a lookup table is constructed by assigning to each index, s, of $FP_s$, the unique index, k, such that $FP_s=FP_{s_k}$ 64. Next, select a small positive integer, Q 65. In the preferred embodiment, the value of Q can range from two to three. For each $FP_{s_k}$ determine, using Euclidean distance, the approximate Q nearest feature vectors, $\{FL_{(n,m)_q}\}$, q=1, 2, . . . , Q, in the training set to $FP_{s_k}$ 66. This step is best accomplished using randomized k-d trees. Next, compute a set of user-definable weights 67 which minimize the following term:

$$\|FP_{s_k} - \Sigma_{q=1}^Q w_q FL_{(n,m)_q}\|^2.$$

The invention computes weights in a simpler, faster manner than neighbor embedding algorithms used by the prior art, as $\vec{w}=(A^TA)^{-1}A^T\vec{y}$ where $\vec{w}=[w_1, w_2, \ldots, w_Q]^T$ is the vector of weights, $\vec{y}=FP_{s_k}$ and $A=[FL_{(n,m)_1}, FL_{(n,m)_2}, \ldots, FL_{(n,m)_Q}]$. This is made possible by not imposing the sum-to-one constraint on the weights used in previous NE algorithms, which is not necessary and may yield non-optimal results. Here, s takes the values 1, 2, 3, . . . , M, where M is the number of patches $P_s$ found in partitioning P into K×K patches. M depends on K and the number of pixels in P. Additionally, the vectors $FP_{s_k}$ are a subset of the vectors $FP_s$, so k takes the values 1, 2, . . . , L, where L is the number unique feature vectors in the set $\{FP_s\}$.

Next, for each $FP_{s_k}$, compute a patch estimate, $R_k$ from the user-definable number of weights computed above and the J×J high resolution patches, $H^*_{(n,m)_q}$ that correspond to the Q nearest feature vectors previously located 68. Here, $R_k$ is computed as follows:

$$R_k = \Sigma_{q=1}^Q w_q H_{(n,m)_q};$$

Using the look up table, identify, for each K×K patch, $P_s$, the integer k that corresponds to s 69. Using this integer k, compute a high resolution patch estimate, $R_k^*$ by adding the mean value of the pixel values in the K×K patch $P_s$ to each pixel value in the patch estimate $R_k$ 70. Next, assign this result to a position in T that corresponds to the location of K×K patch, $P_s$, in P 71 and locate any region within T where the high resolution patch estimates, $R_k^*$, overlap 72. Finally, average the pixel values of the high resolution patch estimates, $R_k^*$ in any overlapping regions 73.

Figure 7:
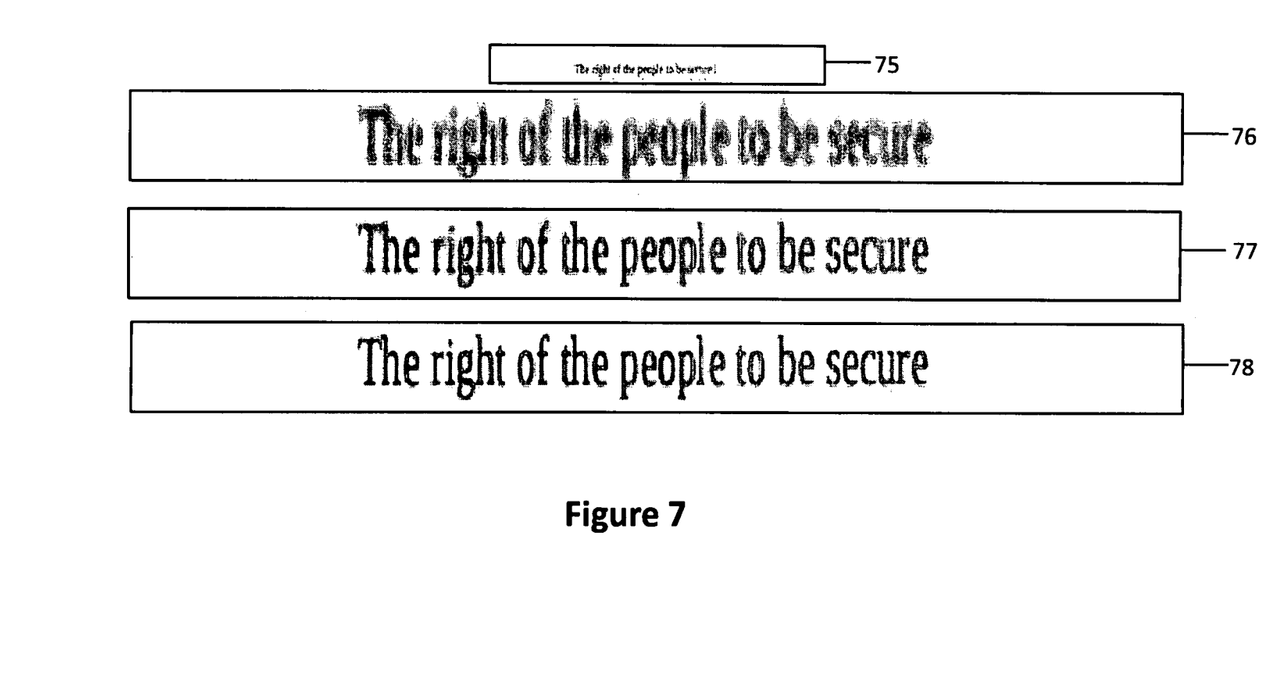
FIG. 7 is an example of the results produced by the present invention.
Figure 8:
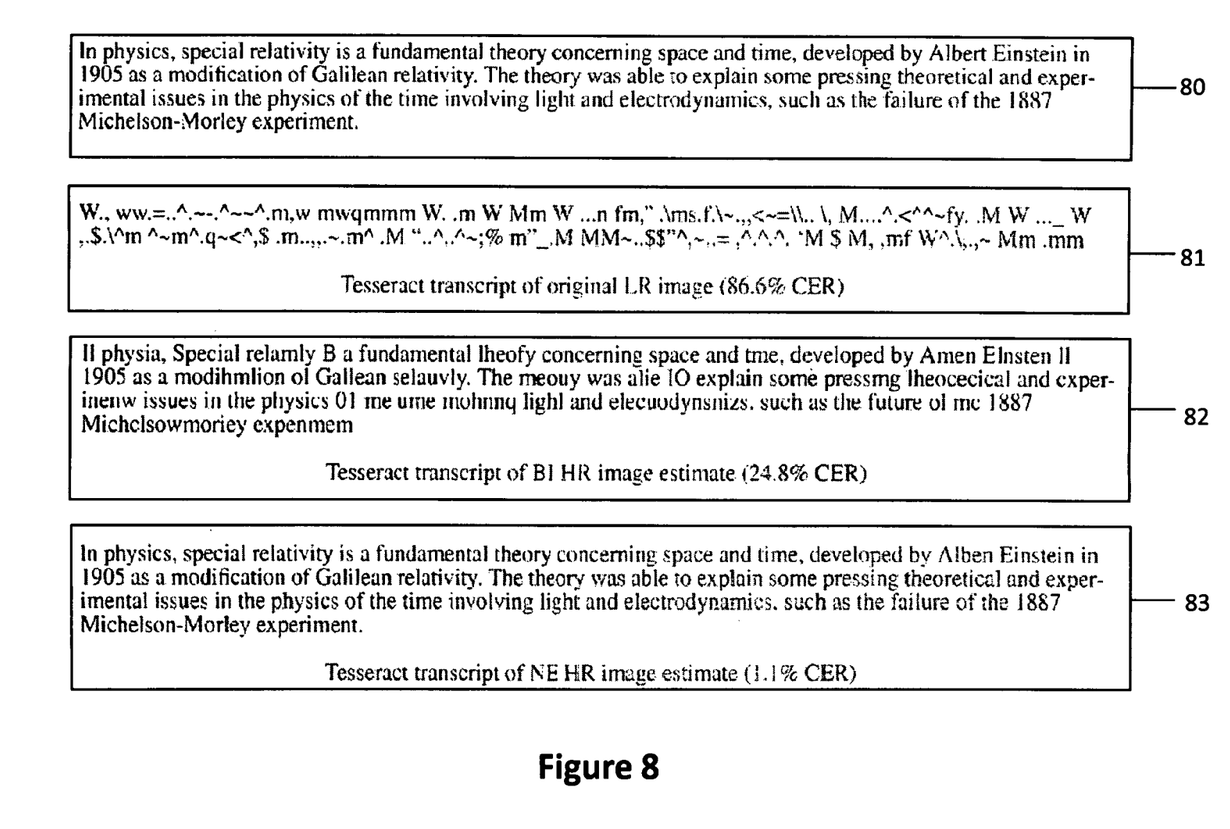
FIG. 8 is an example of the results produced by the present invention.

FIGS. 7-8 depict examples of the result as produced by the present invention for SISR of a text image and for OCR enhancement. FIG. 7 depicts images of a passage from a text document in 8pt Times New Roman font. From top to bottom: (a) LR image of the passage scanned at 75 dpi 75; (b) HR output image produced by prior art (Bicubic Interpolation) at 4× magnification 76; (c) HR output image produced by the present invention at 4× magnification 77; and (d) HR image of the passage scanned at 300 dpi 78. FIG. 8 depicts OCR performance on an Arial 8pt text document. From top to bottom: (a) The actual words in the document 80; (b) OCR transcript from a LR image of the document scanned at 75 dpi 81; (c) OCR transcript from the HR image estimate obtained from the LR image using Bicubic Interpolation at 4× magnification 82; and (d) OCR transcript from the present invention's HR image estimate obtained from the LR image at 4× magnification 83. As shown, the present invention produced the results with the lowest CER.

While the preferred embodiment has been disclosed and illustrated, a variety of substitutions and modifications can be made to the present invention without departing from the scope of the invention.

What is claimed is:

1. A method of neighbor embedding comprising the steps of:
   creating a training of pairs, each having a first element, $FL_{n,m}$, and a second element, $H^*_{n,m}$;
   creating a set of randomized k-d trees from said training set by using said first elements, $FL_{n,m}$, as leaf nodes;
   receiving at least one low resolution text image, P;
   generating a high resolution image, T, from said at least one low resolution text image, P, using said training set and the result of step (b); and generating a text file by inputting said high resolution image, T, into an OCR engine;

wherein the step of creating a training set comprises:
    a. receiving a user-defined set of text documents, $S_n$;
    b. generating, for each $S_n$, a high resolution image, $H_n$;
    c. generating, for each $S_n$, a low resolution image, $L_n$;
    d. selecting a user-definable patch dimension, K, where K is a user-definable small positive integer;
    e. partitioning said low resolution image, $L_n$, into a set of K×K patches, $L_{n,m}$ each having K×K pixel values;
    f. setting J=NK, where both N is a user-definable small positive integer;
    g. partitioning said high resolution image, $H_n$, into a set of J×J patches, $H_{n,m}$, each having J×J pixel values, such that said K×K patch $L_{n,m}$ and said J×J patch $H_{n,m}$ both correspond to a same region in $S_n$;
    h. generating a feature vector, $FL_{n,m}$, having K×K components, for each said K×K patch, $L_{n,m}$; and
    i. generating a J×J high resolution patch, $H^*_{n,m}$, for each said J×J patch, $H_{n,m}$, by subtracting a mean pixel value of said corresponding K×K patch, $L_{n,m}$, from each of said number of pixel values in said J×J patch, $H_{n,m}$.

2. The method of claim 1, wherein the step of generating, for each $S_n$, a high resolution image, $H_n$, is performed by scanning $S_n$ at a high dpi.

3. The method of claim 2, wherein the step of generating, for each $S_n$, a low resolution image, $L_n$, is performed by scanning $S_n$ at a low dpi equal to said high dpi divided by N.

4. The method of claim 3, wherein N is a user-definable small positive integer that ranges from two to five.

5. The method of claim 4, wherein K is a user-definable small positive integer that ranges from two to five.

6. The method of claim 5, wherein the step of generating a feature vector, $FL_{n,m}$, for each said K×K patch, $L_{n,m}$ further comprises:
    a. selecting one of said K×K patches, $L_{n,m}$;
    b. determining a minimum value, $minp_{n,m}$, of said number of pixel values in said K×K patch, $L_{n,m}$, selected in step (a);
    c. subtracting said minimum value, $minp_{n,m}$, from each of said number of pixel values in said K×K patch, $L_{n,m}$, selected in step (a); and
    d. populating said K×K components of said feature vector, $FL_{n,m}$, with the result from step (c).

7. A method of claim 6, wherein the step of generating a high resolution image, T, from said at least one low resolution text image, P, using said training set and the result of step (b) further comprises:
    a. partitioning said at least one low resolution text image, P, into a set of K×K patches, $P_s$, each having K×K pixel values;
    b. generating a feature vector, $FP_s$ for each of said K×K patches, $P_s$;
    c. ordering lexicographically said feature vectors, $FP_s$, generated in step (b);
    d. generating a set of unique features vectors, $FP_{s_k}$, by removing any duplicate feature vectors, $FP_s$, from the result of step (c);
    e. constructing a lookup table by assigning to each index, s, of $FP_s$, a unique index, k, such that $FP_s = FP_{s_k}$;
    f. selecting an integer, Q;
    g. determining the Q nearest feature vectors, $FL_{(n,m)_q}$, q=1, 2, ..., Q, from said training set to each $FP_{s_k}$;
    h. computing a set of weights which minimize
$$\|FP_{s_k} - \Sigma_{q=1}^{Q} w_q FL_{(n,m)_q}\|^2;$$
    i. locating in said training set, the J×J high resolution patches, $H^*_{(n,m)_q}$, that corresponds to the Q nearest feature vectors determined in step (g);
    j. for each $FP_{s_k}$, computing a patch estimate, $R_k$, using the said weights and the J×J high resolution patches, $H^*_{(n,m)_q}$ that correspond to the Q nearest feature vectors found in step (g) and satisfies:
$$R_k = \Sigma_{q=1}^{Q} w_q H^*_{(n,m)_q};$$
    k. using said look up table, identifying for each said K×K patch, $P_s$, the integer k that corresponds to s;
    l. determining a mean value of said number of pixel values in said K×K patch $P_s$;
    m. using said integer k identified in step (k), computing a high resolution patch estimate, $R_k^*$, by adding said mean value to each pixel value in the corresponding patch estimate $R_k$;
    n. assigning the result of step (m) to a position in T that corresponds to the location of K×K patch, $P_s$, in P;
    o. locating any region within T where said high resolution patch estimates, $R_k^*$, placed in step (m) overlap; and
    p. averaging the pixel values of said high resolution patch estimates, $R_k^*$, placed in step (m), in any overlapping regions.

\* \* \* \* \*